INVENTOR.
MIGUEL C. JUNGER
BY *Alfred H. Rosen*
ATTORNEY

INVENTOR.
MIGUEL C. JUNGER

July 21, 1964  M. C. JUNGER  3,142,034
ELASTIC WAVE RADIATOR AND DETECTOR
Filed Feb. 10, 1959  5 Sheets-Sheet 3

INVENTOR.
MIGUEL C. JUNGER
BY
Alfred H. Rosen
ATTORNEY

INVENTOR.
MIGUEL C. JUNGER
BY
ATTORNEY

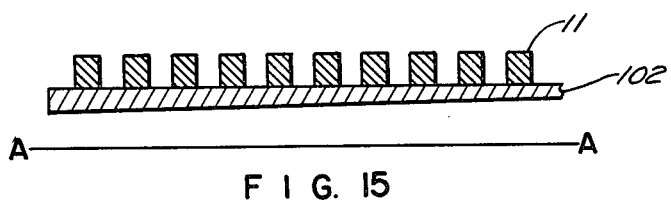
F I G. 15
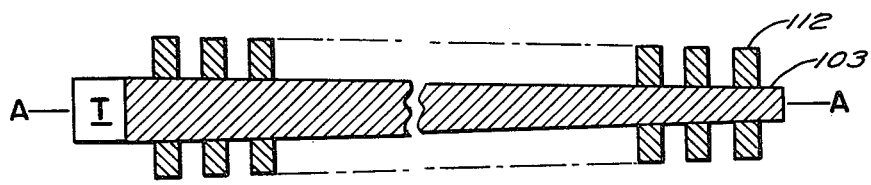
F I G. 16
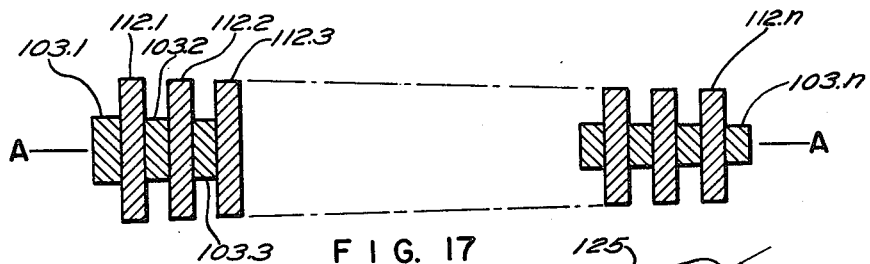
F I G. 17
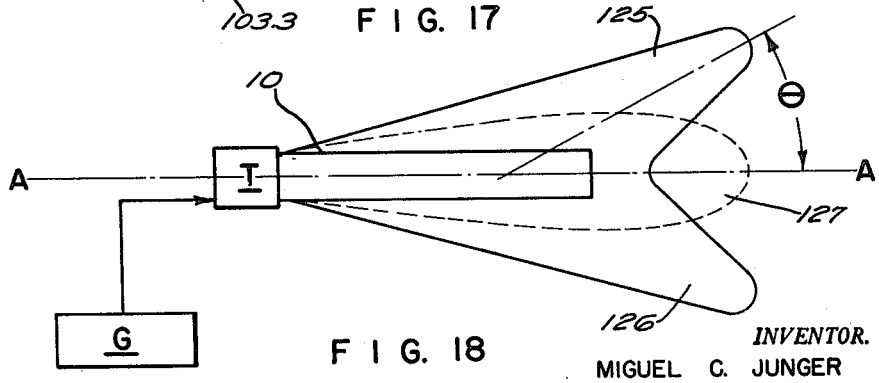
F I G. 18
INVENTOR.
MIGUEL C. JUNGER
BY
ATTORNEY

United States Patent Office 3,142,034
Patented July 21, 1964

3,142,034
ELASTIC WAVE RADIATOR AND DETECTOR
Miguel C. Junger, Cambridge, Mass., assignor, by mesne assignments, to the United States of America as represented by the Secretary of the Navy
Filed Feb. 10, 1959, Ser. No. 792,330
5 Claims. (Cl. 340—8)

This invention relates to elastic wave conductors of the type which are able to couple elastic waves directionally between an elastic wave conductive medium and a source or receiver of elastic waves which need not possess directional characteristics. More particularly, the invention relates to improvements in the construction of elongated conductors which propagate elastic wave energy in the direction of the axis at a velocity or a phase velocity which is related to the elastic wave velocity in the wave conductive medium in a manner to provide directional characteristics to the energy interchange patterns of such conductors.

Electromechanical transducers are known which are capable of introducing fairly large quantities of elastic wave energy into fluid media, such as ocean water; these have found widespread use in underwater signalling and object detecting equipment, and in depth sounders. They include the so-called "Piston" radiators, which introduce energy into water by piston-like vibration of a surface facing the water. Piston radiators, to be usefully directional, require that the piston aperture be at least two wavelengths of the elastic wave energy in the water; thus placing a practical limit on the lowest frequency at which they can be used, in that radiators having appertures more than a few feet in diameter cannot be carried by ships and aircraft. Directivity can also be obtained by an array of point electromechanical transducers, arrayed in a path transverse to the directivity axis; in this case the array must extend over an area similar to that of an equally directional piston radiator, and is subject to the same difficulties. In either of these prior structures, turbulence of the fluid medium, e.g. the ocean, introduces noise. While many improvements have been made in these devices, such as phasing adjacent areas, focusing to reduce side-lobe losses and to enhance directivity, and provision of streamlined housings to reduce the noise due to water turbulence, none has been devised which is free of these undesirable characteristics.

The present invention employs an entirely new principle which enables an electromechanical, hydrodynamic, or other form of transducer having an aperture which is so small compared to the wavelength of elastic wave energy in a fluid medium at any given frequency as to constitute, in effect, a point or omnidirectional source, to be directively coupled to a very high degree with a water or other fluid medium. The transducer is coupled to one end of an elongated conductor of elastic wave energy. If water is the medium into or from which such energy is to be coupled from or to the transducer, the elongated conductor is chosen or designed to propagate in the axial direction, at a velocity equal to or greater than the velocity of compressional wave energy in the water, elastic waves in a mode which will couple with the water through the sides of the conductor. The cross-sectional dimensions (e.g. the diameter) of the conductor may be but a small fraction of a wavelength of the elastic wave energy therein, and this is true also of the transducer. Directivity depends only upon (1) the ratio of the elastic wave velocity in the conductor ($C_i$) to the elastic wave velocity (e.g. sound velocity) in the medium ($C_o$), that is $C_i/C_o$, which is equal to or greater than unity, depending on the directivity pattern desired, (2) the attenuation ($\mu$) due to wave radiation and other losses as the elastic waves propagate along the conductor, and (3) the length ($L$) of the conductor compared with the wavelength ($\lambda i$) of the elastic wave energy therein. To every value of $\mu$ there corresponds an ideal value of the ratio $L/\lambda i$. The smaller is $\mu$, the larger the optimum value of $L/\lambda i$ which is required, and the greater the directivity. It is therefore possible to plot a graph specifying how long the wave conductor must be to obtain a certain beam width, i.e., directivity, assuming that the ideal value of $\mu$ has been selected. Preferably, the ratio $L/\lambda i$ is approximately 20 when $\mu$ is 8 percent. This length merely defines a lower frequency limit below which the conductor will operate less efficiently to couple an electroacoustic transducer directively to the medium.

An elongated conductor having these properties resembles an end-fire directive array of point sources. It can be designed to have a directivity pattern which is essentially frequency-independent over large frequency ranges. Whereas, in piston-type radiators a change in frequency will alter the directivity pattern, in such end-fire conductors a change in frequency affects the pattern only indirectly, through the three controlling parameters:

(1)             $C_i/C_o$
and
(2)             $\mu$
and
(3)             $L/\lambda i$ As indicated above, the restriction on $L/\lambda i$ imposes only a lower frequency limit on the range of frequencies over which the conductor will attain directivity. For frequencies above a minimum frequency, frequency independence can be essentially achieved. Since viscous and other frictional losses are small compared to loss by radiation, $\mu$ is generally frequency independent. In order to hold $C_i/C_o$ frequency independent, one must use for propagation along the conductor a type of wave which has a flat dispersion curve in the intended operating range. Several such types of wave propagation in elastic rods, in the walls of hollow, cylindrical shells, and in mass—and stiffness—controlled fluid-filled hoses exist.

End-fire conductors as described above have been built. One of the problems in their design is that of controlling $\mu$, the radiation, or coupling with the ambient medium, per unit wavelength, or more precisely, the logarithmic decrement per wave length of a wave traveling along the conductor. In the case of a receiver it is always desirable that the coupling be as large as possible. The reason for this is that the incident sound energy is not appreciably diminished by the energy absorbed by the end-fire directive receiver. Hence, even though coupling is large, the wave conductor will absorb energy all along its length and therefore be directive. When, however, it is used as a source of sound, that is, as a transmitter, if coupling is too large, all the energy is radiated over a short initial length of the wave conductor and directivity is not achieved. Also, if the conductor is being driven as a transmitter by a powerful transducer cavitation may result at the end of the conductor nearer the driving source, and this will effectively decouple that end from the medium, thus further reducing the effective length and reducing the directivity of the system. If $\mu$ is too small, a large quantity of energy will arrive at the end of the conductor remote from the driving source, and this will be either radiated from the end which then becomes a non-directional or essentially point source, or it will be reflected to propagate directively in the reverse direction, a phenomenon called "backfire." In the ideal situation $\mu$ is so adjusted that energy is radiated from the conductor essentially as a plane wavefront normal to the directive axis, and vice versa, to achieve directivity. It is an object of this invention to provide an end-fire directive conductor for elastic waves which has this optimum value of logarithmic decrement per wave length of a wave travelling along the conductor.

In a practical wave conductor, projections are provided on the exterior of the conductor for the purpose of coupling energy in a controlled manner between the conductor and the medium. These projections can be in the form of annular fins spaced not more than one-quarter wavelength apart on a cylindrical conductor, as disclosed and claimed in application Serial No. 591,622, filed June 15, 1956, entitled "Sonic Wave Conductor." In order to attain control of the coupling, according to the present invention, the effective radiation per unit length of such a wave conductor is varied from one end of the conductor to the other, being, for example, increased gradually or progressively toward the end of the conductor removed from the driving source in a controlled manner, thus increasing the power level at which the conductor can be driven without cerating cavitation at the power input end, by permitting a nearly constant wave energy level, preferably just below the cavitation threshold, to be maintained over the entire length of the conductor. This permits also the achievement of greater directivity than was heretofore possible. It is another object of the invention to provide an increase in the power level at which an endfire directively coupled elastic wave conductor can be driven.

In order to permit the towing of such wave conductors through water with a minimum of turbulence and hydrodynamic drag, and thereby minimize noise, there is provided according to the present invention a smooth shroud surrounding the conductor without interfering with wave coupling, or, if desired a shroud which takes part in the coupling and may be employed to control the radiation per unit length from a small value at one end to a higher value at the other end of the conductor. A further feature according to the invention is the provision of means to inhibit the formation of axially symmetrical vortex patterns. It is a further object of this invention to reduce to negligible proportions effects arising upon towing such conductors through water, which effects would tend normally to interfere with the desired coupling of wave energy between water and the conductor.

Other and further objects and features of the invention will become apparent from the description of certain embodiments thereof which follows. The description refers to the accompanying drawings, wherein:

FIG. 15 is a partial axial section of another form of tubular conductor having non-uniform coupling characteristics;

FIG. 16 is an axial section of a rod-type wave conductor tapered to provide a non-uniform coupling characteristic;

FIG. 17 is an axial section of another embodiment of the invention according to FIG. 16, assembled from basic components; and FIG. 18 is a directional scanning system.

Figure 1:
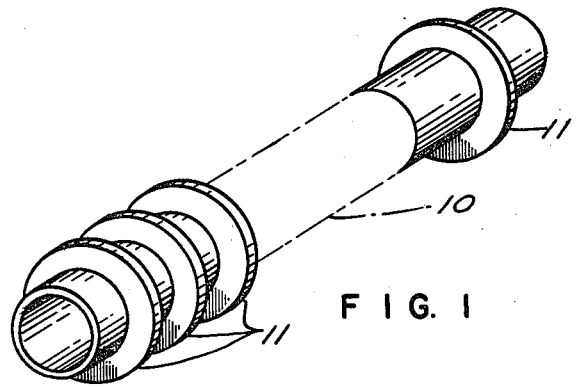
FIG. 1 is an isometric view of a tubular conductor, partly broken away, fitted with annular coupling projections.
Figure 2:
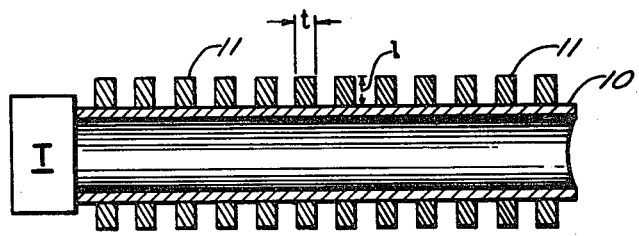
FIG. 2 is an axial section of a conductor similar to FIG. 1 with a transducer fitted to one end of the conductor.

Referring to FIGS. 1 and 2, a conductor of elastic waves in the form of a hollow tube 10 of solid material, which may be metal, ceramic or plastic, is provided with annular fins 11 spaced apart in series in the axial direction. As taught in the aforementioned application Serial No. 591,622, now U.S. Patent No. 2,998,723 of September 5, 1961, the fins are spaced not more than one-quarter wavelength apart, relative to the wave energy propagated by the tube 10. A transducer T (shown in FIG. 2) is coupled to the tube at one end. The transducer is chosen to introduce elastic waves in the tube wall in a mode which propagates at the same velocity as sound in the medium in which it is intended to use the device. If sea water is the medium, the speed $C_1$ of the elastic wave propagated in the tube wall is substantially the speed of sound $C_0$ in sea water when it is desired to achieve a directivity pattern consisting essentially of a single lobe on the axis of the tube 10.

The fins serve a two-fold function. Firstly, they increase the effective inertia of the wave conductor, thus slowing down the stress waves propagating therein. Secondly, fins improve the coupling between the wave motion in the wave conductor and the surrounding fluid medium. That is, they increase appreciably the amount of wave energy radiated or captured per wave length of the wave conductor. This is of particular importance when compressive waves are used, because the fluid injection, that is, wave radiation associated with these waves is, in the absence of fin action, due entirely to the Poisson effect, as will be made more clearly apparent below in connection with FIG. 3A. This effect is relatively small and in some materials it is negligible. Transverse, that is, bending waves, have inherently larger transverse displacement components, which are radial in a tubular wave conductor, and are basically better coupled to the fluid medium. However, in the case also of transverse waves, fins, in addition to increasing the effective inertia of the wave conductor and thereby lowering the phase velocity, may under certain conditions improve the coupling.

The fins which are shown in FIGS. 1 and 2 are annular fins, and are capable of being vibrated in a transverse direction with respect to their radial dimension as seen in the figures. This results in a mode of vibration which has the appearance of an umbrella and is hereinafter called the "umbrella" mode of vibration. If the operating frequency of the transducing device lies below but sufficiently close to the umbrella mode natural frequency of the fins, the fin motion is amplied and the effective inertia is increased. Hence, when operating near resonance a relatively thin fin can be used to supply the required inertia. The natural frequency of a thick fin is comparatively high, and if such fins are used there can be provided a device in which there is no resonant amplification at an operating frequency of the device substantially below the natural frequency of the fins. In such a case the necessary inertia is supplied by the unamplified fin motion. Of course, the mass of a fin can be increased by choosing a more dense material, as well as by making a given material thicker.

Figure 3:
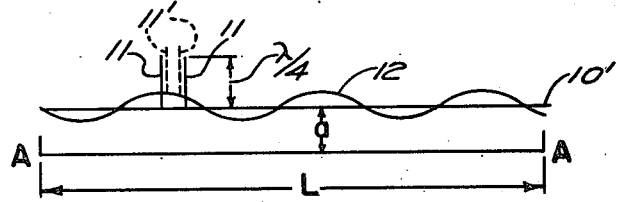
FIG. 3 is a diagram to aid in the explanation of the invention.
Figure 3A:
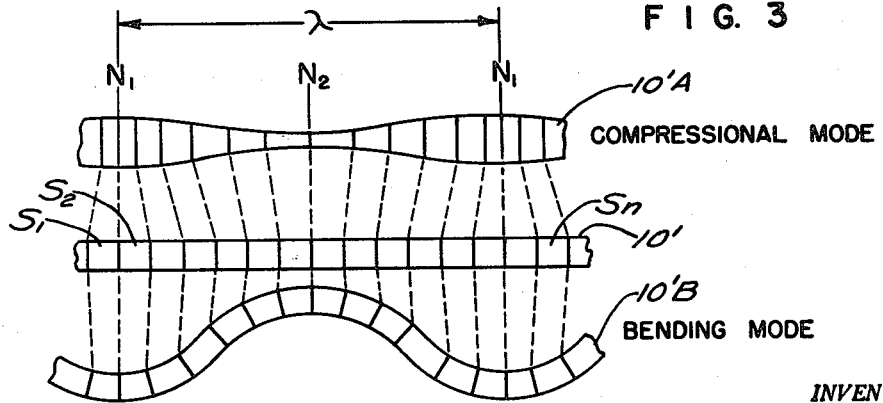
FIG. 3A is another diagram to aid in the explanation of the invention.

FIGS. 3 and 3A illustrate diagrammatically how the fins of the device shown in FIGS. 1 and 2 operate to provide wave energy coupling. In FIG. 3, the line A—A represents the axis of the hollow tube 10, and a line 10' parallel to the axis A—A represents the wall of the tube. Since we are considering a tubular structure, which is a figure of revolution around the axis A—A, the line 10' is adequate for the explanation which follows. The letter "L" represents the axial length of the tube 10, and the letter "$a$" represents its radius.

FIG. 3A illustrates the nature of compressive and transverse, or bending-mode, waves with reference to the section of the tube 10 which is represented by the line 10' in FIG. 3. This section of the tube 10 is used for the sake of example only; it will be appreciated that the element 10' shown might equally well represent a rod of solid cross section. The section 10' is divided by transverse lines into equal portions $S_1, S_2 \ldots S_n$. An instantaneous condition of the section 10' when a compressional wave is impressed upon it at one end is illustrated at 10'A. At any one instant a series of compressions and elongations will exist in the section 10', and over a single wave length $\lambda$ there will be two anti-nodes of compressional strain $N_1$ and a single anti-node of tensile strain $N_2$, for example, as illustrated in the figure. At the anti-nodes of compressional strain $N_1$ the element 10' is thicker, and at the anti-node of tensile strain $N_2$ it is thinner than in its rest condition, due as is well known, to Poisson's effect. Poisson's effect is quite small, however, and by itself would not account for any substantial amount of radiation of elastic wave energy from the tube 10, or from an equivalent solid rod, or for the reception of any great amount of such energy when the device is used as a receiver. The fins 11 provide the desired coupling, as is disclosed in the aforementioned copending application.

The condition of the section 10' during a bending mode or transverse wave is shown at 10'B. The instantaneous condition illustrated in the figure is arbitrarily chosen to be of equal wavelength $\lambda$ to the compressional mode for the sake of illustrating the two modes. At the instant shown, there occurs distortion of the sections $S_1, S_2 \ldots S_n$. The upper surface (in the figure) at 10'B undergoes contraction at the two outermost anti-noral points $N_1$ and elongation at the intermediate anti-nodal point $N_2$, while the lower surface undergoes the opposite effects, that is, elongations at $N_1$ and a contraction at $N_2$.

The phase velocity of compressional waves is basically independent of frequency, at least in many practical frequency ranges for which wave conductors with which the invention is concerned are suitable. A frequency dependence can be obtained with compressive waves, however, if the fins are operated with some resonant amplification, as will be discussed more fully below. Bending waves propagate with a phase velocity which is a function of frequency and which is generally different from that of the compressive waves. Hence compressive waves are preferred where frequency-independence is desired, and it is undesirable to have compressive and bending waves simultaneously.

Referring again to FIG. 3, the serpentine line 12, which may be taken to represent an instantaneous condition of the section 10', can represent a compressional or a bending-or-transverse-mode wave. The instantaneous condition is continuously changing, in a periodic fashion. If we consider any two adjacent fins 11, 11, we see that as a compression or a contraction of the wave 12 passes between them, the wall 10' between them is contracted, simultaneously bringing the fins 11, 11 closer together, so that they assume new relative positions which may be represented by two dotted lines 11', 11'. Considering that during use the device is in a fluid medium, for example sea water, there will be a body of water (not shown) between the fins 11, 11, which will be squeezed between the fins. This action occurs periodically with the frequency of the wave 12, and progressively all along the tube 10. It is essentially the mechanism by which the fins couple elastic wave energy from the tube 10 into the medium, and vice versa.

Referring again to FIG. 2, the length "$l$" of the fins 11 is chosen to provide the desired degree of coupling of wave energy from the wave conductor (tube 10) to the medium, and hence to control the attenuation ($\mu$) per unit length of the wave conductor. As is mentioned above, coupling action of the fins is due to the squeezing of the liquid of the ambient medium between the fins, that its to the relative axial motion of neighboring fins. This is related to the axial strain in the wave conductor (tube 10 or a rod) rather than to the deflection of the fins. Hence, while fin length is a factor in controlling coupling, fin resonance is not a factor. The effective fin mass is a factor in determining the inertia of the tube, and hence the phase velocity of elastic waves which will propagate in the wave conductor. Using a relatively short thick fin will provide a fin that has a relatively large natural frequency and can be operated "off resonance" with respect to the frequency of operation which is of interest, to provide an essentially frequency-independent directivity pattern. If one chooses to use a thinner fin, having less inherent inertia and having therefore a lower natural frequency, the lighter fin may then be operated near resonance. However, while this will increase the effective inertia of the fin, and therefore of the wave conductor, it does not affect the coupling because it does no affect the axial strain in the tube.

Reliance on resonant amplification in the fins makes the phase velocity frequency-dependent. The result of this is that an increase in frequency toward the umbrella mode natural frequency of the fins causes a drop in phase velocity. This has certain advantages, in partcular that of permitting compensation for any changes in sound velocity of the surrounding sea water as a result of temperature fluctuations, changes in salinity and the like. This may also be desirable if the end fire wave conductor is operated with $C_i$ larger than $C_o$, that is when the directivity pattern is such that two lobes are displayed. In this case a change in frequency can be used to produce a change in $C_i$, which in turn results in a change in the angular separation between the two lobes of the directivity pattern. A practical application of this possibility is described later in this specification.

When a thin shell tube such as tube 10 in FIG. 2 or FIG. 1 is used there may be some tendency for the fins when under large energy conditions to induce some bending waves into the tube when the tube is in fact being operated under compressional waves. As is explained above, it would be undesirable to have bending and compressional waves simultaneously. This undesirable effect can be eliminated by adopting the structure shown in FIG. 4.

Figure 4:
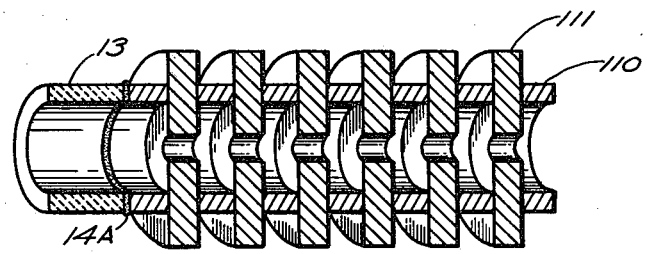
FIG. 4 is a partial axial section of a finned tubular conductor assembled from basic elements.

In FIG. 4, a tubular finned elongated structure is shown, which is constructed of alternate cylindrical spacers 110 and fin members 111 which are stacked and fastened together by any suitable means, such as welding or soldering. A cylindrical axial-vibration electromechanical transducer 13 may be coupled to one end of this structure by any suitable cement 14A. The cylindrical spacers constitute in effect a tube similar to the tube 10 in FIG. 2. The fin members 111 are discs or washers of greater diameter externally than the spacers 110 and having smaller inside central bores than the internal diameter of the spacers 110. There results in effect a structure in which the disc elements 111 constitute fins which project inwardly as well as outwardly with respect to the tube 110. Fins constructed in this manner are unable to set up bending waves in the tube 110 because any tendency of the externally projecting portions to cause bending of the tube is exactly counteracted by the internally projecting portions. The fins 111 need merely extend equally inwardly and outwardly from the mean surface of the shell 110. The symmetrical forces exerted by the vibrating fins do not then give rise to bending effects on the shell wall. In addition such a configuration can be used to reduce the coupling between the ambient liquid and the wave guide while retaining a desired inertia value for the wave conductors as a whole, since a given fin inertia is obtained with fins of relatively smaller outside diameter. Such a system can readily be built up from alternating thin walled and thick walled segments of tubing having the same mean diameter. Again, as mentioned above, it is possible to reduce the size of the fins by using a heavier material for the fins, that is for the thick wall segments, than for the thin wall segments. For example, the thin walled segments, namely the tube or shell 110 could be made of aluminum and the fins 111 could be made of brass.

Figure 5:
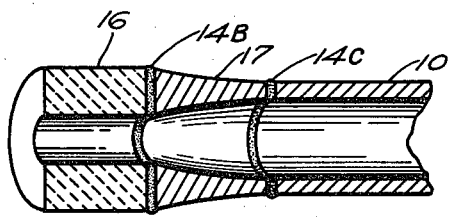
FIG. 5 illustrates a transducer coupled through a motion amplifier to a cylindrical wave energy conductor.

FIG. 5 illustrates a structure for amplifying vibrations, that is, raising the stress due to wave energy supplied from a cylindrical axial-vibration electromechanical transducer 16 to the tube 10. In this case, the fins have not been shown, to simplify the illustration; the figure should be viewed as though they were present. The vibration amplifier 17 is a figure of revolution of tapering thickness, coupled at its thick end to the transducer 16 and at its thin end to the tube 10. Any suitable cement 14B and 14C, such as an epoxy cement, may be used to connect these elements together. As is well-known, the tapered configuration of the motion amplifier 17 will execute particle displacement at the thinner end which is greater than the particle displacement imposed on the thicker end by the transducer 16. With this structure the amplitude of the vibrations introduced into the tube 10 by the transducer 16 can be greatly increased.

Figure 5A:
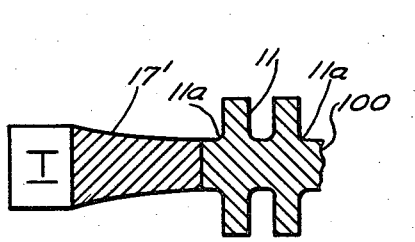
FIG. 5A shows a transducer coupled through a motion amplifier to a solid-rod wave energy conductor.
Figure 5B:
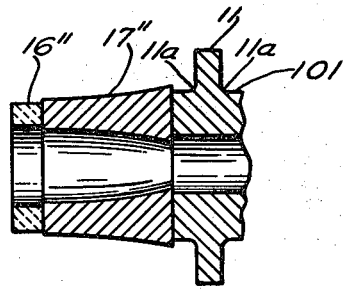
FIG. 5B shows a transducer coupled through a motion amplifier to a cylindrical wave energy conductor in a manner useful as a receiver.

FIGS. 5A and 5B illustrate two additional modes of employment of a tapered coupling element similar to element 17 in FIG. 5. In FIG. 5A a rod 100 with fins 11 is coupled to a transducer T by means of a tapered solid cone 17' which has characteristics similar to cone 17 of FIG. 5. This enables the transducer T to drive the rod 100 with increased amplitude; in the case of a transmitter it may be desirable that the rod be driven at an amplitude which approaches the strength of the material of which the rod is made. FIG. 5A would, if used as a receiver, tend to reduce the amplitude of signals applied to the transducer T.

It should be understood that the embodiments of FIGS. 5 and 5A are useful for both sending and receiving elastic wave energy. FIG. 5B shows an arrangement which may be more suitable for use as a receiver. In this embodiment a tube 101 (like the tube 10 of FIG. 2) is coupled to a tapered tubular motion amplifier 17" at the wide end, and the narrow end is coupled to the transducer 16". Received signals are therefore increased in amplitude when applied to the transducer 16".

Whenever the fins 11 are machined out of, or are otherwise made of the same piece of material as, the wave conductor, for example of the conductor 100 in FIG. 5A or of the conductor 101 in FIG. 5B, it is desirable to have fillets 11a at the bases of the fins, in order to minimize the strains at these points.

When a cylindrical body is dragged through a fluid medium, vortices form on its surface. The vortices may peel off in rather regular fashion, thus giving rise to pressure fluctuations having an effective wavelength. In general, particularly at high speeds, the vortices do not form a regular pattern. The flow is then described as turbulent. The corresponding pressure fluctuations do not correspond to a definite wavelength. See, for example, Part I, Chapter I, of "Hydrodynamics," by Dryden, Murnaghan and Bateman, published by Dover Publications, Inc., New York, N.Y., 1956. When a listening device in the form of a piston-type transducer is dragged through water, the pressure fluctuations corresponding to turbulence will activate the transducer and cause "noise," that is, an unwanted response of the system.

When a receiver in the form of a cylindrical wave conductor is dragged through liquid, there occur random pressure fluctuations and regular pressure fluctuations having a wavelength which does not correspond to the sound velocity in the liquid, i.e., to the phase velocity in the wave conductor. They are therefore poorly coupled to the wave conductor and are discriminated against as compared to pressure fluctuations associated with an incident sound wave. The cylindrical wave conductor is therefore inherently less sensitive to turbulent noise than the piston-type transducer. It can be made to discriminate even further against turbulent noise by providing it with a transducer which responds only to axially symmetrical fluctuations, as signals displaying a dependence on the cylindrical polar angle will be averaged out over the face of the transducer.

Theoretically, an axially-symmetrical regularly-spaced pattern of vortex rings moving along the wave conductor with a velocity essentially the same as the velocity of sound can give rise to axially-symmetrical pressure fluctuations which will couple with the wave conductor. This velocity condition will never be fulfilled in practice. It is possible, for example, if the fins are exposed to the medium, to achieve an axially-symmetrical pattern of vortex rings moving along the conductor at some other velocity, which can give rise to axially-symmetrical pressure fluctuations which, however, will be only poorly coupled to the wave conductor, and which can be discriminated against as indicated above. It is, however, advantageous to eliminate axially symmetrical pressure fluctuations due to turbulence by breaking up any axially-symmetrical vortex rings. This can be achieved by providing the wave conductor with a wedge-shaped or cruciform bow, or any other sort of termination which will break up axially-symmetrical vortices.

Figure 6:
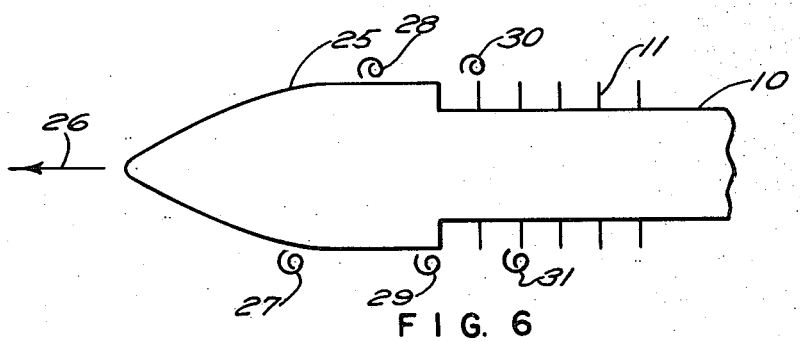
FIG. 6 is a diagram illustrating the control of certain effects of vortices.

FIG. 6 illustrates diagrammatically the function of a wedge-shaped bow structure in breaking up axially-symmetrical vortices, or vortex rings. The leading end (with respect to the towing direction) of the device is fitted with a wedge-shaped bow 25, which is connected to the tube 10 (in a manner to be described in detail in FIG. 7). As the device with the bow 25 moves through water in the direction of the arrow 26, vortices 27, 28, 29, 30, 31, etc., start somewhat aft of the nose of the bow, and slip along each side, thus forming a regular pattern of eddies, or a "vortex street," in a plane parallel to the axis of the tube 10 and containing a wedge-shaped cross-section of the bow 25. In other planes containing the axis of the tube 10 the vortex conditions will be different, so that the formation of axially-symmetrical vortices is inhibited with this bow structure.

Figure 7:
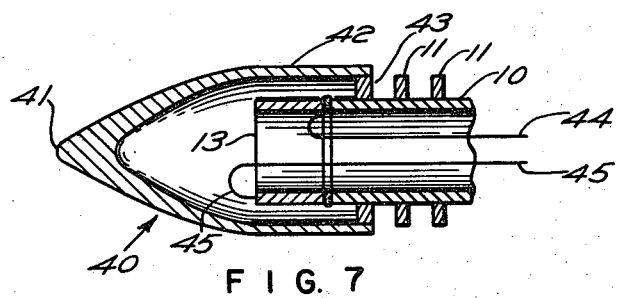
FIG. 7 is a sectional view of a vortex controlling structure.
Figures 8, 9:
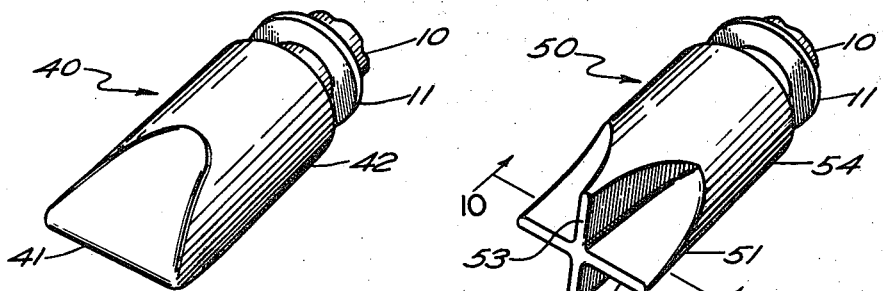
FIG. 8 is an isometric view of the vortex controlling structure of FIG. 7.
FIG. 9 is an isometric view of another vortex controlling structure.

FIGS. 7 and 8 show a transducer structure designed according to FIG. 6. A bow member 40, having a wedge-shaped leading edge 41 and cylindrical rear body 42, is attached to the wave conductor 10 by means of an annular mounting member 43 which is affixed to the conductor ahead of the fins 11. For the purposes of illustration, the electroacoustic transducer structure 13 of FIG. 4 is shown, but it will be appreciated that other electroacoustic transducer structures may be used. In FIG. 7, the cylindrical transducer 13 is housed in the rear body 42 of the bow member, and electric wires 44 and 45 are brought to the transducer through the tube 10. The bow member may be bolted, soldered, welded or otherwise attached to the annular mounting member 43, which in turn may be affixed to the cylindrical wave conductor 10 in the same manner as the fins 11.

Figure 10:
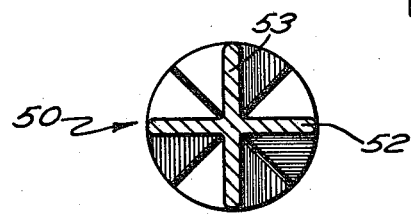
FIG. 10 is a section along line 10—10 of FIG. 9.

As will be appreciated from the description of FIG. 6, the structure of FIGS. 7 and 8 will have its greatest effect in breaking up axially-symmetrical vortices in one plane which includes the longitudinal axis of the wave conductor 10, but will have little or no effect in an orthogonally related plane which includes that axis. The bow structure 50 shown in FIGS. 9 and 10 breaks up axially-symmetrical vortices in both of such planes, leaving intermediate planes unaffected, and therefore produces a pattern of turbulent flow which is still further removed from the axially-symmetrical pattern. This bow member is wedge-shaped at its leading end 51 in two mutually-perpendicular directions, to provide two mutually-perpendicular leading edges 52 and 53. The rear body 54 is cylindrical in shape, like the rear body 42 in FIG. 7. The most desirable form of bow is believed to be a comparatively blunt wedge, similar to that of a submarine.

Figure 11:
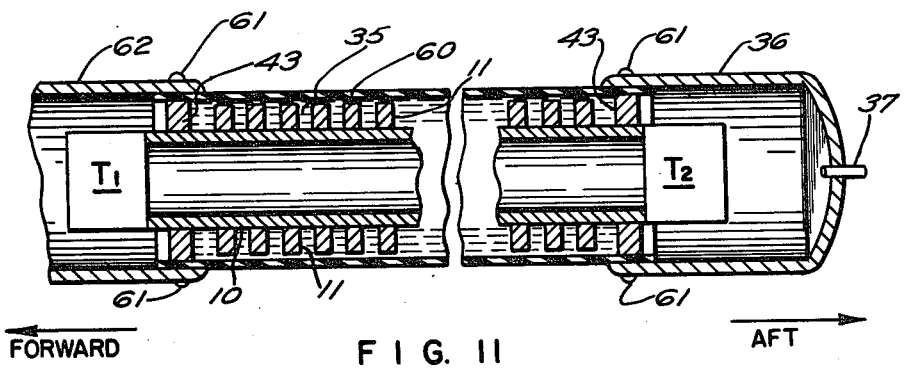
FIG. 11 is an axial section of a conductor fitted with a shroud.

Towing the wave conductor through water will give rise also to hydrodynamic drag, which will accompany vortices arising at the outer peripheries of the fins. Such drag and vortices can be minimized by providing a shroud 60 around the wave conductor as shown in FIG. 11, in which the tube 10 and fins 11 of FIG. 2 are illustrated by way of example. The shroud may be made of rubber or a soft plastic material, such as polyethylene film. It should be of sufficiently large internal cross-sectional dimensions so that it does not bear on the fins 11 at their peripheries. The shroud may be mounted at one end (the "front" end of the wave conductor relative to the direction in which it is intended to be towed) by means of an annular mounting member, for example the mounting member 43 of FIG. 7, and held in place by an external annular clamp 62 which is fastened to the mounting member 43 by means of pins, bolts or the like 61 passing through the shroud into the mounting member. The clamp 62 may be the rear body portion 42 or 54 of one of the wedge-nosed bow members 40 (FIG. 7) or 50 (FIG. 9). The shroud 60 will provide an enclosure for fluid coupling medium 35 in contact with the fins 11 and tube 10, while at the same time reducing hydrodynamic drag and inhibiting the formation of vortices at the peripheries of the fins 11. This can be assured by initially filling the space between the shroud 60 and the wave conductor 10 with the medium 35 (e.g., ocean water) through which the transducer is intended to be towed, or with another liquid.

The liquid 35 employed can be made to serve four functions:

(a) It can protect the wave conductor against corrosion, marine growth, and mechanical damage.

(b) It can be selected and degassed so as to have a high acoustic cavitation threshold.

(c) By selecting a heavy liquid it can contribute appreciably to the inertia provided by the fins.

(d) By carefully selecting the characteristic impedance of the liquid, coupling between the wave guide and the ambient acoustic medium can be controlled independently of the fin dimensions.

While no specific form of transducer $T_1$ is shown in FIG. 11, it is obvious that a transducer may be incorporated, for example, as shown in any of FIGS. 2, 4, 5 or 7. Likewise, a second transducer $T_2$ of any desired form may be employed at the aft end (with respect to the towing direction) of the wave conductor, enclosed in a cylindrical housing 36 which is attached to the conductor in the same manner as the clamp 62 at the forward end. A stuffing tube 37 in the aft housing 36 will serve as a water-tight passage for electrical connections (not shown) to the transducers $T_1$ and $T_2$. It will be appreciated that the function of bows, as shown for example in FIGS. 7–11, inclusive, is twofold. They serve not only to break up axially-symmetrical vortices, but also to minimize drag and therefore to minimize turbulence, the latter function being similar to that of the shroud 60.

Figure 12:
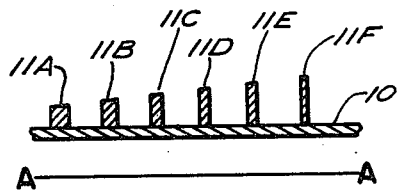
FIG. 12 is a partial axial section, showing progressive variation of coupling characteristics with respect to axial distance in a conductor.

FIG. 12 illustrates a modification of the energy coupling fins which enables the wave conductor to radiate higher levels of wave energy. As was mentioned above, $\mu$, the attenuation per unit wave-length, is ideally adjusted to provide directional radiation, but this condition can deteriorate if the wave conductor is driven as a transmitter by a sufficiently powerful transducer to cause cavitation at the end of the conductor nearer the driving source. In the embodiment according to FIG. 12, the percent of total energy which is radiated per unit wave-length, $\mu$, is progressively increased in a controlled manner from the end of the conductor nearer the electroacoustic transducer to the far end. This enables the wave conductor to be driven at a higher power level, which might cause cavitation at the input end (as a transmitter) of a wave conductor having a uniform value of $\mu$. FIG. 12, like FIG. 3, is partly diagrammatic. The wall 10 of the conductor is shown at one side only of the axis A—A. The fin 11A at the left-hand end, which is the input end of the conductor as a transmitter, is made shorter than the others, and the fin 11B adjacent to it is made slightly longer. In turn, the fins 11C, 11D, 11E and 11F, are each made progressively longer. This progressive lengthening of the fins correspondingly increases $\mu$, from left to right in FIG. 12. In order to preserve the uniform modification of the phase velocity of the elastic wave energy in the conductor 10, the shorter fins in FIG. 12 are thicker than the longer fins, with the first fin 11A the thickest and the last fin 11F the thinnest. By reducing $\mu$ an amount necessary to prevent cavitation during radiation of high-level input energy (at the left-hand end), and progressively increasing $\mu$ toward the output end of the wave conductor by amounts which will bring the amount of energy radiated per unit wavelength of the conductor up to a level just under that which will produce cavitation, the total amount of energy which can be radiated is maximized, without introducing cavitation losses, and hence increasing, rather than causing deterioration of, directivity. In other words, with this structure, a nearly constant sound pressure, preferably just below cavitation threshold, can be maintained over the whole length of the wave conductor 10, thus permitting the injection of larger amounts of energy and achieving even greater directivity.

Figure 13:
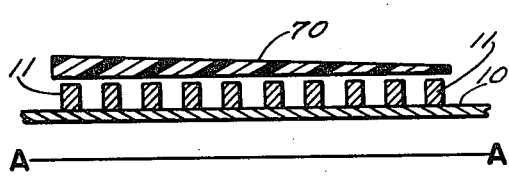
FIG. 13 is another partial axial section showing a second structure employing a shroud to provide progressive variation in coupling with respect to distance along the conductor.

FIG. 13 shows an alternative structure for accomplishing the same effect as the embodiment of FIG. 12. In this embodiment, the wave conductor 10 and fins 11 are constructed according to the same principles as those in FIG. 2. A shroud 70, similar in purpose to the shroud 60 in FIG. 11, is provided, but having the additional property of controlling radiation from the wave conductor. The shroud 70 is made thicker at the left-hand end (i.e., the energy input end, as a transmitter), and gradually becomes thinner toward the output end (right-hand). The thickness of the shroud is, however, not shown to scale. In order to affect the propagation of wave energy between the wave conductor 10 and the medium outside the shroud, the shroud must have a thickness equal to a substantial fraction therein of a wavelength of the energy, and its "$\rho c$" should be significantly different from that of the ambient medium (e.g. the ocean) and from that of the enclosed fluid coupling medium (not shown( but like medium 35 in FIG. 11). Suitable values of "$\rho c$" can be achieved by using steel (higher than th emedia) or foamed plastic (lower than the media). The thickness of the shroud will depend on the material chosen. In FIG. 13, the shroud 70 is cross-hatched to show plastic.

The shroud 70 is in effect a pipe tapering in wall thickness from one end to the other. Thus, while the shroud 60 in FIG. 11 has substantially no effect upon the passage of elastic wave energy through it, the shroud 70 in FIG. 13 has an effect in proportion to its wall thickness, namely, to modify the effective $\mu$ of the wave conductor, in a gradual manner, from a relatively low value at the left-hand end in FIG. 13 to a relatively higher value at the right-hand end. As in FIG. 11, the shroud 70 does not touch the fins 11.

Figure 14:
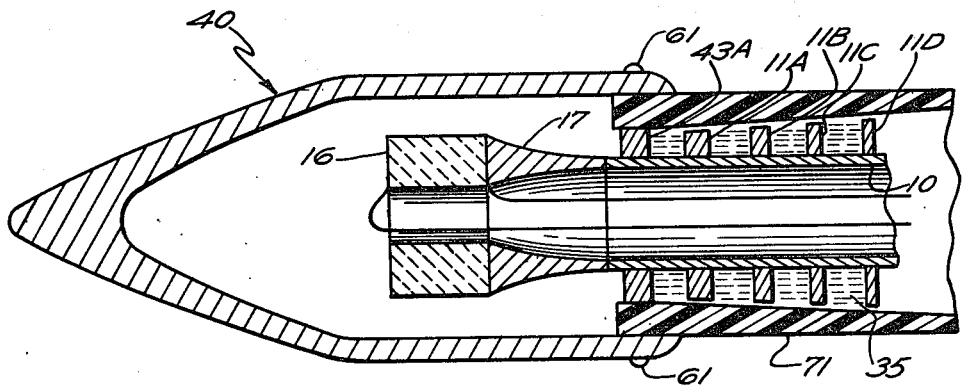
FIG. 14 is an axial section of a structure combining some of the features of FIGS. 5, 7, 11, 12 and 13.

FIG. 14 shows an embodiment which combines the features of FIGS. 12 and 13 with those of FIGS. 5, 7 and 11. In this figure, the wave conductor 10 is provided with the mounting member 43A and fins 11A, 11B, 11C, 11D, etc., of progressively increasing length and decreasing thickness. This arrangement is combined with a shroud 71 of constant exterior diameter and gradually increasing interior diameter (from the left-hand end to the right-hand end), which has the properties of the shroud 70 in FIG. 13. The properties of FIG. 12 and FIG. 13 are each provided to such a degree in FIG. 14 that, when combined, they have the net effect sought to be obtained alone by one or the other of them in FIG. 12 or FIG. 13. The wave conductor is driven by the high-power transducer 16 and stress amplifier 17 of FIG. 5, and these elements are enclosed by a bow member, which is shown as bow member 40 of FIG. 7, but may if desired be the bow member 50 of FIG. 9. As in FIG. 11, the bow member and shroud are affixed to the mounting member by means of pins, bolts, or the like, 61, and the shroud 71 does not touch the fins of the wave conductor 10. The embodiment of FIG. 14, because it combines features which permit high level radiation of wave energy with high directivity, and provides means for driving the wave conductor 10 at a high level, and means for reducing the disadvantageous effects of vortices and hydrodynamic drag, is a highly advantageous structure for directively transmitting high power level wave energy.

Other structures for obtaining the effects of FIGS. 12, 13 and 14 are shown in FIGS. 15, 16 and 17. In FIG. 15 the tube 102 is tapered from the left-hand end to the right-hand end, thus bringing into play the principle of the tapered horn as a stress or force amplifier. This tapering of the tube 102 will boost the amplitude of the stress wave from left to right just sufficiently to make up for the attenuation as a result of sound radiation, when the device is used as a transmitter with a transducer coupled to the left-hand end. The tapering does not have to be continuous, that is, the wave guide may be built up stepwise by means of sections of decreasing outer or inner diameter.

FIG. 16 shows the same principle as that of FIG. 15, applied to the solid rod 103. The rod is tapered from the left-hand to the right-hand end and the fins 112 are in this instance reduced in outer diameter so that their actual length with respect to the rod is maintained constant. Features of FIG. 12 or FIG. 14 could be brought into play here by leaving the outer diameters of the fins constant if desired. Again, in FIG. 16 a transducer T shown at the left-hand end indicates that the directivity pattern of the device of FIG. 16 is toward the right in that figure. FIG. 17 illustrates a manner of constructing the device of FIG. 16 by assembling alternate elements of smaller and larger diameter in the fashion of the embodiment of FIG. 4. The rod is constructed of elements 103.1, 103.2, 103.3 . . . 103.$n$, and the fins are constructed of discs 112.1, 112.2, 112.3 . . . 112.$n$. Similar technique to those applied to the embodiment of FIG. 4 would permit the construction of the embodiment of FIG. 15 by assembly of alternate elements as in FIG. 4 and in FIG. 17. If the outer diameters of all the fins, 112 in FIG. 16, or 112.1 . . . 112.$n$ in FIG. 17, are maintained equal, while the rod 103 or 103.1 . . . 103.$n$ is progressively reduced in diameter, the coupling factor $\mu$ is increased simultaneously with the increase in axial strain in the rod due to the reduction in its diameter, thus enhancing the effect of progressively increasing the value of $\mu$ from one end of the conductor to the other.

As was mentioned above, if the end fire wave conductor is operated with $C_i$ larger than $C_o$, the directivity is such that two lobes are displayed, as is shown in FIG. 18. That is, the directivity pattern consists essentially of two lobes 125 and 126 making similar angles with and on opposite sides of the axis of the wave conductor (e.g. the tube 10), when the wave conductor is viewed in axial section; in reality these two lobes are cross-sections of a directivity pattern which is essentially a hollow conical figure of revolution. In this case a change in the frequency of operation can be used to produce a change in $C_i$, which in turn results in a change in the angular separation between the two lobes of the directivity pattern, or more precisely, a change in the angular opening of the hollow conical figure of revolution. An example of how this mode of operation may be employed for the location of a scattering object by frequency sweeping is as follows.

Suppose that the operating frequency of the wave guide is periodically swept through a range lying between the frequencies $f_1$ and $f_2$, by means, for example, of a swept-frequency signal generator G and a transducer T. If the phase velocity is frequency-dependent, then the former frequency corresponds to a phase velocity $C_{i1}$, and the latter frequency to a different phase velocity $C_{i2}$. This frequency-dependence of the phase velocity can be achieved by using near-resonant fins or bending waves. As is mentioned above, raising the operating frequency toward the natural frequency of near-resonant fins causes a drop in the phase velocity. If flexural waves are used, raising the operating frequency will raise the phase velocity. Now assume further that the lower of these phase velocities, say $C_{i2}$, is equal to $C_o$, and that the larger of these phase velocities $C_{i1}$ is equal to $1.3C_o$. Under these circumstances, when operating the device at the frequency $f_2$, the directivity pattern 127 is pointed in the end-fire direction and any echo returned at that frequency is located on the axis A—A of the wave conductor. When operating the device at the frequency $f_1$, the ratio $C_o/C_i$ is equal to $1/1.3$, i.e., 0.77. Under these circumstances, the directivity pattern displays two lobes 125 and 126 which are symmetrical with respect to the wave conductor axis A—A and whose angular separation from the axis is equal to an angle $\theta$, such that $\cos \theta = C_o/C_i$, i.e., in the present case 0.77. It is found that $\theta$ is then equal to 39.6 degrees; thus any echo returned at the frequency $f_1$ is located on an axis making this angle with the axis of the wave conductor. For an intermediary frequency, $C_i$ will be smaller and the axis of the lobe closer to the wave conductor axis. Thus two directions are associated with every frequency in the range between $f_1$ and $f_2$. These two directions are symmetrically located with respect to the wave conductor axis. It is therefore possible to locate the angular position of a scattering object lying within the angles swept by the lobes of the directivity pattern, as the frequency is cycled through its range. In the example just given the angle thus swept would be twice 39.6 degrees, i.e., 79 degrees.

The embodiments, methods of construction, and methods of operation herein shown and described are intended only as illustrations of the invention. Other embodiments will occur to those skilled in the art. No attempt has been made herein to go into all possible embodiments, but rather only to illustrate the principles of the invention and the best manner now known to me to practice it.

What is claimed is:

1. Apparatus for use in elastic wave radiation and receiving systems comprising, in combination, a cylindrical element made of a material capable of sustaining the propagation of elastic waves therethrough;

means coupled to one end of said element for introducing periodic elastic waves therein when excited;

a series of annular fins projecting from the outer wall surface of said cylindrical element and equally spaced therealong with the separation between adjacent fins being less than one quarter wave length of said periodic elastic waves as measured in the medium surrounding said cylindrical element, each pair of adjacent fins coupling a portion of the elastic waves introduced into said cylindrical element into said surrounding medium whereby the amplitude of said introduced elastic waves progressively diminishes as said waves propagate toward the opposite end of said cylindrical element, successive fins of said series extending progressively greater distances outwardly from said outer wall surface with the fin immediately adjacent said one end extending the shortest distance therefrom whereby each pair of adjacent fins couples equal amounts of the elastic waves into said surrounding medium, successive fins of said series also having progressively decreasing thickness with the fin immediately adjacent said one end having the greatest thickness whereby the phase velocity of said elastic waves is maintained constant as said elastic waves propagate towards said opposite end of said cylindrical element.

2. Apparatus for use in elastic wave radiation and receiving systems comprising, in combination, a tubular element made of a material capable of sustaining the propagation of elastic waves therethrough;

transducer means coupled to one end of said element for introducing periodic elastic waves into said element when excited;

a series of annular fins projecting from the outer wall surface of said element and equally spaced therealong with the separation between adjacent fins being less than one quarter wave length of said periodic elastic waves as measured in the medium surrounding said element, each pair of adjacent fins coupling a percentage of the elastic waves introduced into said element into said fluid medium whereby the amplitude of said elastic waves progressively decreases as said waves travel down said element toward the opposite end thereof, successive fins of said series extending progressively greater distances outwardly from said wall surface with the fin immediately adjacent said one end extending the shortest distance therefrom whereby the amount of the elastic waves coupled to said surrounding medium by successive pairs of adjacent fins is equalized, successive fins of said series also progressively decreasing in thickness, with the fin immediately adjacent said one end having the greatest thickness, the distance each fin extends outwardly from said wall surface and the thickness of each fin being proportioned to maintain the phase velocity of said elastic waves constant as said elastic waves propagate down said tubular element towards the opposite end thereof.

3. In an arrangement as defined in claim 2, a tubular shroud surrounding said tubular element and in a noncontacting relationship with respect to the outer peripheral surfaces of said fins, whereby said fins are free to vibrate when excited by the elastic waves propagating through said tubular element, said shroud being made of a material that is capable of sustaining the propagation of elastic waves therethrough.

4. In an arrangement as defined in claim 3 wherein the wall thickness of said tubular shroud tapers throughout its length with the thickest portion thereof being adjacent said one end of said tubular element whereby the impedance presented by said shroud to elastic waves propagated therethrough correspondingly decreases from said one end of said shroud to the other end thereof.

5. In an arrangement as defined in claim 2, a wedge-shaped bow member connected to the opposite end of said tubular element, said bow member being tapered toward its free end and producing a nonsymmetrical flow of the fluid from which said surrounding medium is composed past said annular fins when said tubular element is moved through said surrounding medium with said opposite end forward whereby elastic waves introduced into said tubular element because of its movement are of an incoherent nature.

References Cited in the file of this patent

UNITED STATES PATENTS

| | | |
|---|---|---|
| 986,024 | Odenbaugh et al. | Mar. 7, 1911 |
| 1,524,520 | Junkers | Jan. 27, 1925 |
| 1,936,706 | Affel | Nov. 28, 1933 |
| 2,210,415 | Kellogg | Aug. 6, 1940 |
| 2,663,797 | Kock | Dec. 22, 1953 |
| 2,684,725 | Kock | July 27, 1954 |
| 2,713,263 | Turner | July 19, 1955 |
| 2,774,193 | Thatcher et al. | Dec. 18, 1956 |
| 2,865,008 | Kock | Dec. 16, 1958 |
| 2,906,971 | Mason et al. | Sept. 29, 1959 |
| 2,927,322 | Simon et al. | Mar. 1, 1960 |